UNITED STATES PATENT OFFICE.

FENNER H. PECKHAM, JR., OF PROVIDENCE, RHODE ISLAND.

GALVANIC BATTERY.

SPECIFICATION forming part of Letters Patent No. 285,066, dated September 18, 1883.

Application filed December 1, 1882. (No specimens.)

*To all whom it may concern:*

Be it known that I, FENNER H. PECKHAM, Jr., of Providence, in the county of Providence and State of Rhode Island, have invented certain new and useful Improvements in Galvanic Batteries; and I do hereby declare that the following is a full, clear, and exact description of the invention, which will enable others skilled in the art to which it appertains to make and use the same.

My invention consists in charging a battery with glycerine or a mixture of glycerine and water, in connection with the ordinary chemicals used in batteries, nitric acid excepted. The proportion of glycerine relatively to the other chemicals employed, or relatively to the water, may vary with circumstances; but I find good results attend its use in the proportion, say, of twenty-five per cent. glycerine to seventy-five per cent. water in the Leclanché and similar batteries, and from twenty-five to fifty per cent. in gravity-batteries, the proportion being varied according to the use for which the battery is required. In all cases the mixture of glycerine and water should be made before the usual chemicals are added.

The advantages resulting from this use of glycerine in batteries I find to be the following, viz: In the gravity-battery the blue-vitriol solution is prevented from rising and depositing copper on the zincs; the zincs are more easily cleaned; the specific gravity of the solution is more constant; the deposit of crystals on the jar and connections is very much lessened, as is also the evaporation; the mixture will not freeze, except at a very low temperature; the glycerine is also non-volatile. Batteries thus charged with glycerine solution do not diminish in electro-motive force on exposure to low temperature to so great an extent as those charged in the usual manner.

In the Leclanché and similar batteries this glycerine solution prevents the deposit of crystals on porous cups and around the metal fastenings of the carbons, and which, when it occurs, causes the rapid deterioration of the battery.

Though the electro-motive force may be somewhat reduced in cells charged as above described, yet the above-recited and other advantages due to my invention, resulting, as they do, in diminished expense in care and maintenance, more than compensate for any additional cost for additional cells required.

I claim—

For charging galvanic batteries, the combination of glycerine with the chemicals ordinarily employed, and substantially as set forth.

FENNER H. PECKHAM, JR.

Witnesses:
WILLIAM S. PEASE,
CHRISTR. RHODES.